Feb. 17, 1970  A. SCHREIBER  3,495,712
APPARATUS FOR PURIFYING WASTE WATER
Filed June 16, 1967  4 Sheets-Sheet 1
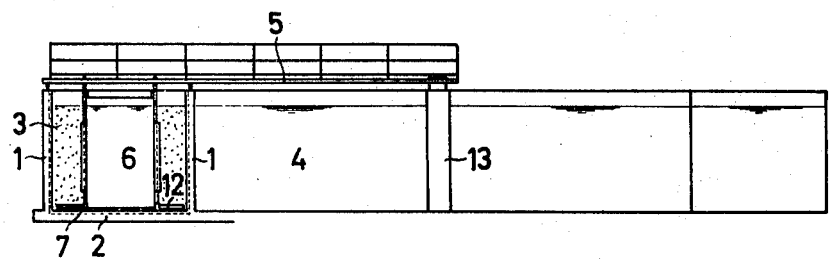
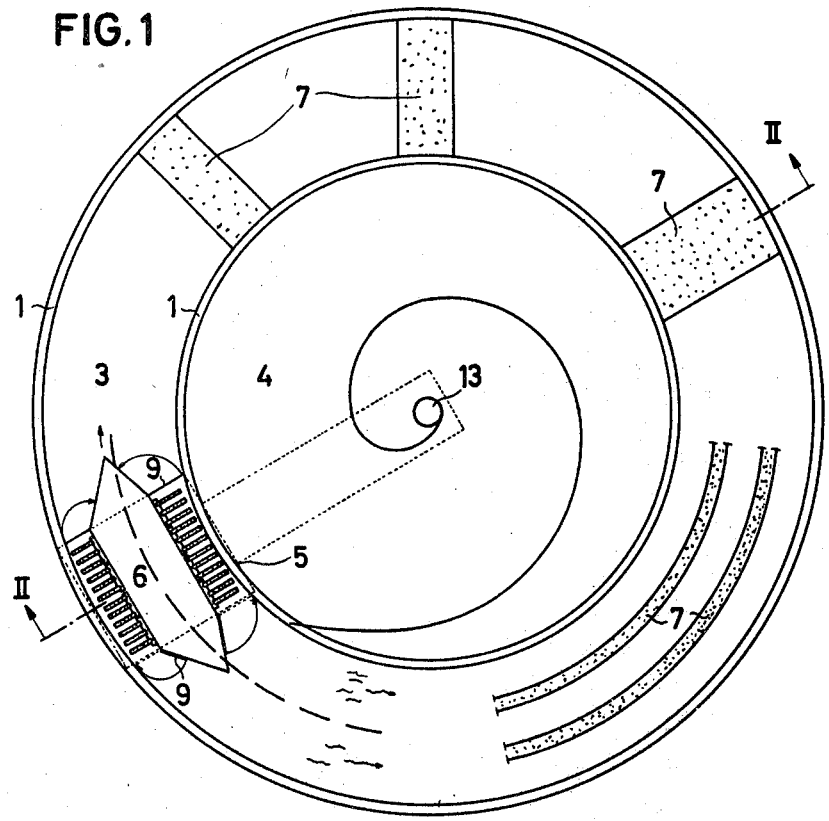
INVENTOR.
August Schreiber

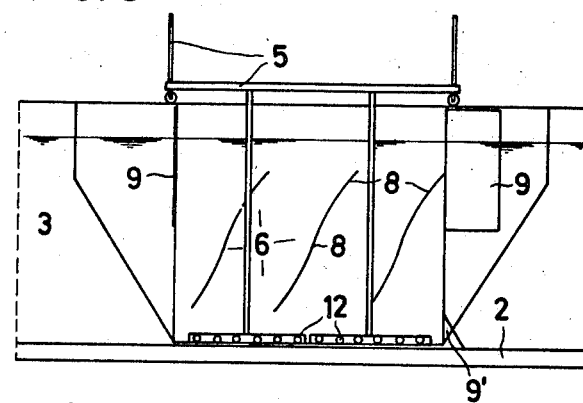
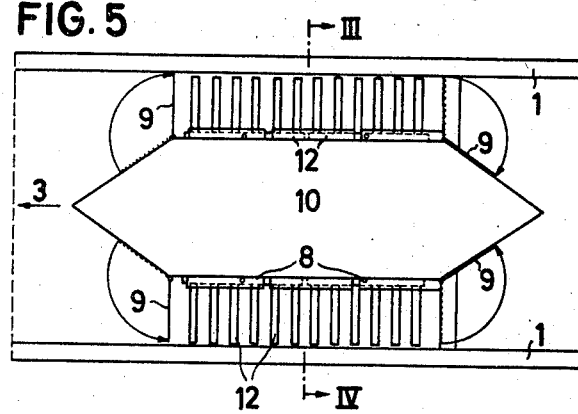
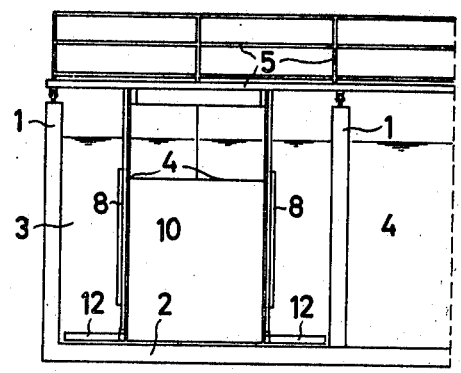

Feb. 17, 1970  A. SCHREIBER  3,495,712
APPARATUS FOR PURIFYING WASTE WATER
Filed June 16, 1967  4 Sheets-Sheet 4

INVENTOR.
August Schreiber
BY
Watson Cole Grindle & Watson
Attys.

United States Patent Office 3,495,712
Patented Feb. 17, 1970

3,495,712
APPARATUS FOR PURIFYING WASTE WATER
August Schreiber, Bahnhofstrasse 45A,
Hannover-Vinnhorst, Germany
Filed June 16, 1967, Ser. No. 646,631
Claims priority, application Germany, Nov. 9, 1966,
Sch 39,796, Sch 39,797
Int. Cl. C02c 5/10, 1/10, 1/02
U.S. Cl. 210—220                                  4 Claims

ABSTRACT OF THE DISCLOSURE

A method for purifying waste water by injecting air into a mixture of activated sludge and waste water, and imparting a horizontal flow to said mixture for the purpose of ventilating or aerating the mixture. The apparatus for carrying out the method comprises a tank for the mixture to be aerated, the tank being fitted with a movable ventilating device including a frame which carries a baffle or damming device for imparting the horizontal flow to the sludge and waste water mixture, for the aeration thereof. The tank may also have ventilating means in the bottom thereof for causing air bubbles to ascend through the horizontally moving stream of activated sludge and waste water.

---

Figure 7:
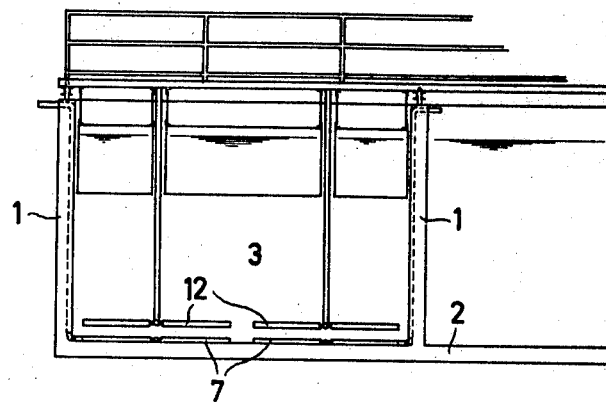

This invention relates to a method of and an apparatus for purifying waste water, wherein air is blown into a flowing mixture of waste water and activated sludge by ventilating devices.

With activated sludge installations, air is generally blown into the mixture of activated sludge and waste water, the said air imparting a vertical circulating motion to the water, thereby ventilating the mixture and holding the activated sludge in suspension. It has been found that a more economic utilisation of the oxygen of the injected air and lower current costs are possible if the air is blown or injected into a mixture of waste water and activated sludge which is flowing horizontally.

In connection with this more economical method, ventilating or aerating devices are known in which guide walls or baffles are provided above and below the aeration pipes or plates. Due to the ascending water movement and the baffles, the mixture of waste water and activated sludge assumes a horizontal movement, whereby the contact time and thus the utilisation of oxygen is assisted. In addition, horizontally disposed damming members which are moved on the bottom of the tank are known, these causing a horizontal movement of the waste water and activated sludge mixture by their movement and by the narrowing of the tank cross-section; the air is blown into said mixture and thus also a better utilisation of oxygen is achieved. With the known so-called oxidation pit, this better utilisation is only partially achieved, while with other purifying plants, for example, according to German Patent specifications No. 1,202,227, the effect is indeed better, but with comparatively high energy consumption for setting the mixture of activated sludge and waste in motion.

The invention has for its object to achieve the described purification of waste water with more simple means and a lower energy consumption.

As regards the method, the invention proposes that a movable ventilating or conveying device and optionally also a fixed ventilating device provided on the bottom of the tank are operated in such a way that the movable ventilating or conveying device is moved through the contents of the tank by the injected air alone and/or by an external force, and as a result the content of the tank or a part thereof is given a horizontal flow and, optionally with the provision of a bottom ventilating device, flows transversely through ascending air bubbles, the air bubbles ascending from the movable ventilating device and also from the fixedly installed ventilating device being traversed transversely at the bottom of the tank by the activated sludge and waste water mixture.

By means of the method, a long residence time of the air bubbles in the activated sludge and waste water mixture can be achieved while avoiding a high expense for energy.

The invention further proposes that the movable ventilaing device is moved by the air-lifting pumping action of its own ventilator.

The method according to the invention is thus further developed in such a way that the movement achieved by the air-lift pumping action of the ventilators is braked by an external force on the enclosing wall and thus a more rapid horizontal movement of the waste water and activated sludge mixture to be aerated or ventilated is achieved at the movable ventilating device.

Another embodiment of the method according to the invention is characterized in that the movable ventilating device is moved by itself or together with an external motive force.

As regards the apparatus for carrying out the method according to the invention, the invention proposes a movable ventilating or conveying device, which is extended as a whole in a vertical direction through the entire depth of water. It is expedient if the movable ventilating device is provided with a damming or float member extending over the full depth of water, said member having baffles and damming walls and aeration surfaces so arranged thereon that the ventilating device is automatically advanced and the mixture of activated sludge and waste water is ventilated in a horizontal flow.

Another constructed form of this apparatus is characterised in that the movable ventilating device is provided with a driven frame or chassis or an additional brake device, by which the horizontal flow of the activated sludge and water mixture to be aerated is increased.

Another proposal of the invention consists in that a driving motor is provided which has a starting circuit for setting and keeping in motion the movable ventilating or conveying device.

It is further proposed according to the invention that the chassis or frame should be adapted to travel on the surrounding walls, should have a driving means for faster or slower advancing movement and the ventilating device should be provided with ventilators in the vicinity of the tank base, so that with supply of air, the ascending air bubbles act as a damming body, and by the movement of this damming body, the content of the tank is given a unidirectional movement and the activated sludge and waste water mixture flows through the ascending air bubbles from the base ventilation system horizontally in the same direction, but also the introduced air cushion of the movable ventilating device is traversed horizontally in the opposite direction of movement.

Another proposal of the invention is characterised in that the chassis of the movable ventilating or conveying device is for example supported in the manner of a swing bridge on a vertical central shaft of the annular tank and/or on the enclosing walls of the tank.

Furthermore, it is proposed that the ventilation tank should be subdivided by concentric partitions into two or more ventilating chambers which are for example concentric and connected in parallel or series, the ventilating or conveying device correspondingly also consisting of several parts which are fixed to a common chassis or to a common travelling bridge or swing bridge.

It is further proposed according to the invention that the ventilating device constructed for reciprocating movement in an elongated tank should have, on both transverse sides, damming walls which can be collapsed and of which those at the front in the direction of movement are set transversely and those at the rear are set parallel to the direction of movement, switching devices which can be changed over by stops on the length-defining transverse walls being provided.

Another constructional form of the invention is characterised in that additional damming members are provided on both sides of the chassis or baffle system in the region of the water level, the said damming members deflecting downwardly the activated sludge and waste water mixture with the air bubbles introduced by the movable ventilating device, thereby increasing the contact time between the said air bubbles and the horizontal flow.

Another proposal of the invention consists in that, more especially with a chassis or guide system constructed as a swing bridge, the latter has fixed thereon a pipe conduit serving to convey the return sludge from the tip of the hopper of the post-clarifying tank to the movable ventilating devices.

It is further proposed according to the invention that the movable ventilating or conveying device should be provided with a switch arrangement and a reserve ventilating system, said switch arrangement being positively switched on when the circulating movement of the movable ventilating device fails, in order thereby to impart a circulating movement to the contents of the tank.

The invention also proposes the arrangement of fixedly installed ventilating devices on the bottom of the ventilating tank, the said devices being arranged in one or more rows transversely of the direction of travel and over the entire width of the ventilating tank.

Another constructional form of the invention is characterised in that radial or concentric ventilators are arranged distributed on the bottom of the ventilating tank, the said ventilators having arranged thereabove a driving shield which extends radially and approximately vertically over the entire width and depth of the tank, the said shield revolving around the centre of the tank and imparting a circulator motion to the entire contents of the tank.

It is further proposed according to the invention that ventilators should be arranged on the bottom part of the driving shield for assisting the loosening of the sludge which has possibly settled on the bottom of the tank.

Finally, it is proposed according to the invention that the driving shield should be vertically adjustable on a travelling bridge or swing bridge and should be arranged in an inclined position differing from the vertical, so that there is no obstruction to the obliquely ascending air bubbles.

By means of the invention, there are provided the following possible ways of carrying out the ventilating method:

(1) Movable ventilating device with baffle members and ventilation or aeration and with damming surfaces or baffles for the automatic advance in the mixture of waste water and activated sludge. In this way, there is produced a vertical flow of the waste water and activated sludge mixture to be ventilated in the region of the constricted tank cross-section of the movable ventilating device. The other contents of the tank remain at rest.

(2) The same as under (1), but with a partial braking of the movable ventilating device on the tank walls. In this way, there is achieved a greater flow velocity as mentioned under (1), of the waste water to be ventilated in the constricted ventilating tank cross-section, due to the braking resistance. The contents of the tank are also set in movement in the opposite direction to the movable ventilating device.

(3) The same as under (2), but with external drive in the direction of travel, with or without damming members or baffle surfaces, with fixedly installed ventilating devices on the bottom of the tank. In this way, a horizontal flow velocity of the mixture of waste water and activated sludge is obtained, both for the ventilation of the movable ventilating device and a horizontal flow velocity of the waste water and activated sludge mixture for the ventilating devices fixedly arranged in the bottom.

(4) The same as under (3), but without fixedly installed baffle surfaces of a damming member. This effect is obtained by an increased introduction of air to the entire tank cross-section in the region of the movable ventilating device. In this way, the same as under (3) is obtained.

(5) For all four possibilities, the movable ventilating device can have additional, transversely disposed damming member on its rearward end, so as to conduct the ascending air bubbles with the waste water and activated sludge mixture enclosing them in a downward direction, whereby the contact time and the utilisation of oxygen is additionally increased.

Figure 6:
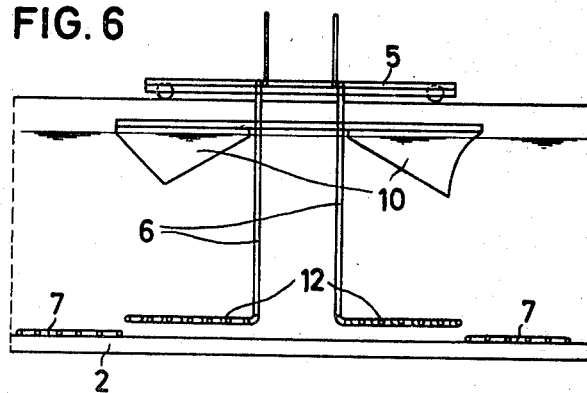
Figure 8:
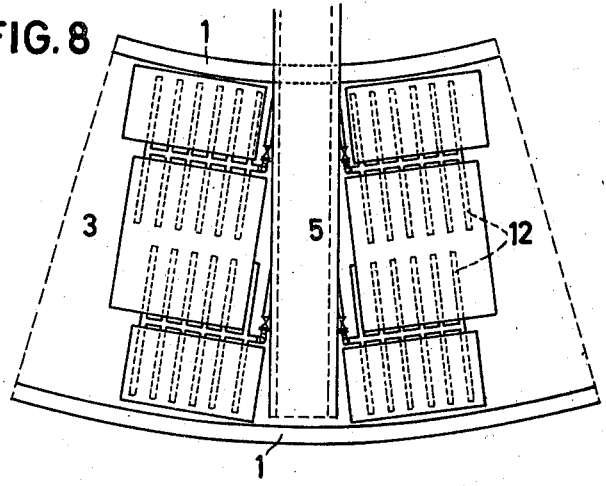
Figure 9:
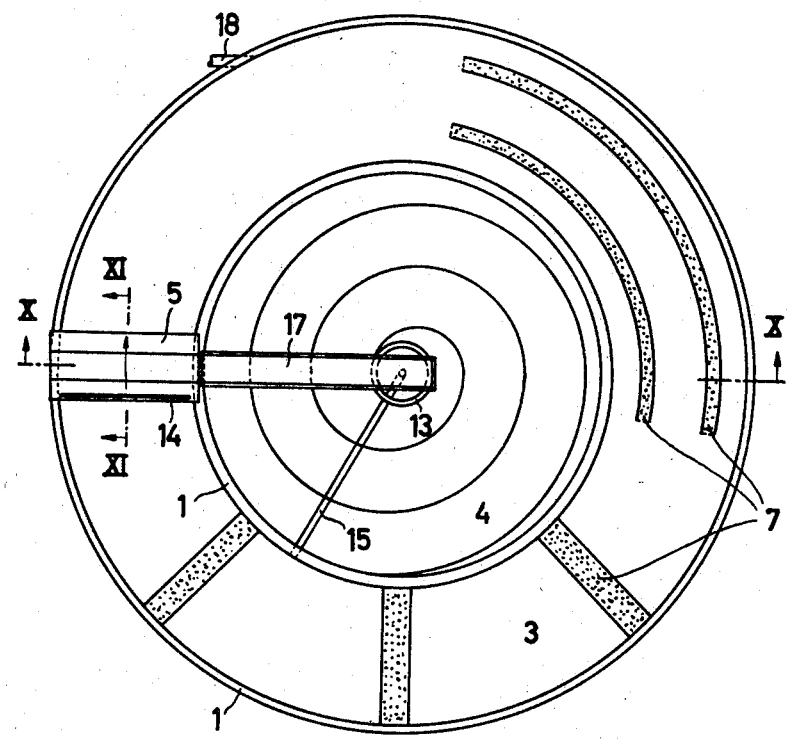
Figure 10:
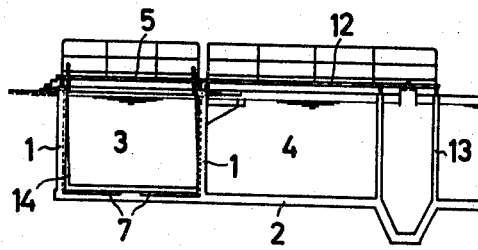
Figure 11:
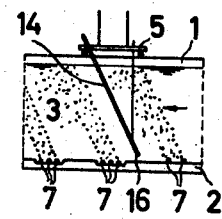

For a better understanding of the invention, constructional embodiments thereof will now be described, by way of example, with reference to the accompanying drawings, wherein:

FIGURE 1 shows a movable ventilating or conveying device in accordance with the invention in an annular tank, with or without circulatory motion of the activated sludge and waste water mixture and with a fixedly installed bottom aerating device, FIGURE 2 is a section through the annular tank on the line II—II of FIGURE 1, FIGURE 3 is a longitudinal sectional view showing a movable, travelling or floating ventilating device in an elongated tank, with reciprocatory movement of the movable ventilating device, either by the injected compressed air or by an external additional motive force, FIGURE 4 is a section through the ventilating device according to FIGURE 5 on the line III–IV, FIGURE 5 is a plan view of the movable, floating or travelling ventilating device according to FIGURES 3 and 4 for reciprocatory movement, FIGURE 6 is a cross-sectional view showing a movable travelling or floating ventilating device with only small damming surfaces, installed in an aeration tank with ventilators arranged in the bottom of the tank, FIGURE 7 is a longitudinal sectional view showing the ventilating device according to FIGURES 6 and 8, FIGURE 8 is a plan view of the movable ventilating device according to FIGURES 6 and 7, FIGURE 9 is a plan view of a clarifier tank according to the invention with a movable conveyor device, FIGURE 10 is a section along the line X—X of FIGURE 9, on an enlarged scale, and FIGURE 11 is a section on the line XI—XI of FIGURE 9.

FIGURES 1 and 2 show a clarifier installation with external walls 1, a tank base or floor 2 and a tank space 3 in which a movable ventilating device 6 is fixedly connected to a swing bridge or moving frame 5. The swing bridge 5 is mounted to be rotatable about a middle shaft 13 of the annular tank and can be constructed so as to float on the movable ventilating device 6 or to bear thereon and be driven on the external wall 1. FIGURES 1 and 2 show the arrangement in an annular tank, but it is obvious that a movable ventilating device, given a reciprocatory movement, can also be installed in an elongated tank.

The reference 4 indicates a post-clarifying tank which is enclosed by the annular tank 3, while 7 indicates ventilators fixedly arranged on the bottom 2 of the tank.

FIGURES 3, 4 and 5 show a movable ventilating device 6 to a larger scale, which can for example be installed so as to float in an annular ventilating tank or can also be installed in an elongated tank. The movable ventilating device 6 comprises a chassis or frame 5 with a control gear which, with an annular tank, is arranged to be rotatable about its centre 13. The frame 5 can, however, also be movably mounted on the side walls of the ventilating tank 3. Fixed on the frame 5 is a damming or float member 10, which fills a large part of the cross-section of the ventilating tank 3 and extends from the bottom of said tank to above the water level. On the transverse walls, the baffle member 10 has acute extensions on both sides, by which the resistance to movement in the activated sludge and water mixture is reduced. The length of the damming member 10 is kept so large that it becomes possible for the flow space for the waste water and activated sludge mixture between the damming member 10 and the external walls 1 to be sufficiently ventilated with the ventilating pipes or plates 12 fixed on the frame 5. Damming walls 9 are provided at the transition from the pointed extensions to the actual damming member 10. These walls 9 can either be folded on to the front or back pointed flow extensions or they can also be set transversely of the direction of flow, and thus close off the flow cross-section between the damming member 10 and the external walls 1 over a certain depth. Provided on the lateral outside walls of the damming member 10 are guide bars 8, which deflect into a vertical direction the mixture of water and activated sludge flowing upwardly as a result of the ventilation. Another damming wall 9′ is fixed on the lower and rear end of the damming member 10 opposite the damming wall 9 which is set transversely of the direction of movement and is provided in the upper part of the tank.

The movable ventilating device according to FIGURES 3, 4 and 5 functions in such a way that when compressed air is fed into the ventilator 12, a mixture of activated sludge and waste water is drawn in and is carried upwardly with the ascending air bubbles. The mixture of activated sludge and waste water can enter on the front side beneath the damming wall 9 and can only emerge on the rearward side over its full height, except for the damming wall 9′ provided behind the ventilating pipes. The asecending mixture of activated sludge and waste water can consequently only emerge in a rearward direction and thus pushes forward the entire ventilating device 6 towards the side of the transversely set damming wall 9. This forward movement is further assisted by the guide bars 8 and the damming walls 9′ provided near the bottom 2 of the tank. In this way, the waste water, with movement of the damming member 10, for example, with an absolute velocity of 25 cm./sec., must flow through between the damming member and outside walls, if the movable ventilating device 6 occupies approximately half the cross-sectional surface of the tank and the absolute velocity of the ventilating device 6 is likewise 25 cm./sec.

If the movable ventilating device is to move backwards and forwards in an elongated tank, then the damming flaps 9 which are situated at the front in the direction of movement are set transversely, while the damming flaps on the rearward side as regards the direction of movement are hinged on to the pointed extension of the damming member 10. The change in position of these damming flaps with a reciprocatory movement in an elongated tank can be achieved by stops on the transverse walls closing off the elongated tank and by switch levers provided on the movable ventilating device 6. With this arrangement, one pair of damming walls is set transversely, while the other pair is folded over in the direction of flow.

FIGURES 6, 7 and 8 show a movable ventilating device 6 co-operating with the enclosing walls 1 of the tank. A ventilating device 6 is fixedly connected to a travelling swing bridge or a frame 5 and is moved by an external driving force through the mixture of activated sludge and waste water, thereby ventilating the latter.

Stationary ventilators 7 are installed on the bottom 2 of the tank, these being distributed over the entire cross-section or split up into separate sections, said ventilators also forcing air into the tank. In this way, a section of the tank saturated with air bubbles is produced in the region of the ventilating device 6, and this section, because of the movable ventilating device, progressively displaces the contents of the tank in the direction of travel and has a suction effect on the side opposite to the direction of travel. In this way, a circulating motion of the entire contents of the tank is obtained. Since both the tank section saturated with air in the region of the ventilating device 6 and the ventilated space above the fixed floor ventilators 7 are pervious for the mixture of activated sludge and waste water, ascending air bubbles are traversed transversely by waste water and activated sludge mixture, not only in the region of the movable ventilating device 6, but also above the fixedly installed ventilator 7, and thus there is better utilisation of the oxygen. It can be further increased if damming member 10 intensify the horizontal movement near the water level. The damming members 10 can be so shaped that they impart a downwardly directed flow to the activated sludge and water mixture permeated with air bubbles and thus lengthen the time of contact of the air bubbles. It is possible to cause the air circulation produced by the ventilation to extend either transversely or longitudinally of the ventilation to extend either transversely or longitudinally of the ventilating tank 3. In FIGURES 6 and 7 and also on the right side of FIGURE 1, the air distributors 7 fixedly installed on the bottom of the tank 2 are shown in such a way that the forming air circulation is parallel to the tank walls 1.

As can be seen from FIGURES 9 to 11, the clarifying installation consists of an annular ventilating tank 3, a centrally arranged clarifying tank 4, the ventilators 7 for ventilating the bottom of the tank and the conveyor device fixed for vertical adjustment on a bridge 5 which can travel on the encircling walls 1, said conveyor device being in the form of a driving shield 14 for initiating and maintaining the movement of the circulating water, which shield can optionally be provided on its underside with a ventilating or flushing device 16. The driving shield 14 for producing the horizontal flow can either be arranged by itself to be movable on the enclosing walls 1, or the bridge 8 of the driving shield, with slow movement, can be connected to the clearing device 17 mounted on the central shaft 13 of the clarifier tank 4. The driving shield 14 is arranged in an inclined position differing from the vertical.

In the supply pipe 18, the water flows, freed from coarse lumpy impurities, into the ventilating tank 3, is mixed therein with activated sludge, is ventilated and then passes through the clarifier tank 4 into the main channel (not shown). The activated sludge being developed and conveyed in the aerating tank 3 is held back in the clarifier tank 4 and is, for the major part, thence conveyed through the return pipe 15 back to the ventilating tank 3, a part thereof being eliminated in suitable manner as excess sludge.

The advantageous ventilating of the ventilating tank contents in a manner which saves energy proceeds in such a way that the travelling conveyor device enclosing the parts 14, 16 and 5 is given a rotating movement, whereby also the contents of the tank have a rotating flow imparted thereto. The air bubbles ascending from the bottom 2 of the tank are no longer able to ascend vertically, but are carried along by the flowing activated sludge and water mixture and thus can only rise slowly to the surface, more slowly than if they produce a stream of water directed vertically upwards, in which they also again produce a certain ascending speed.

In this way, it becomes possible for the introduction of oxygen and the utilisation of the activated sludge method to be used with lower expenditure of energy for purifying waste water.

According to the invention, it is possible for the ventilating tank to be subdivided by concentric partitions into two or more concentric ventilating chambers which are connected in parallel or series and it is also possible for the driving shield 14 to consist of several parts, which are fixed to a common frame or swing bridge 5.

As is clear from the drawing, the arrangements according to the invention consist of a movable ventilating or conveying device which is given a rotating movement in the contents of the tank and possibly of ventilators fixedly installed on the bottom of the ventilating tank. The movable ventilating device can be driven in an annular tank with a rotating movement, with a floating movement due to the introduced air or in any other way. The movement produced in this way can also be braked, or even the movement of the movable ventilating device can be produced by an external motive force, which is supported on the side walls. In addition to supplying air into the ventilators of the movable ventilating device, air can also be supplied through ventilators provided in a fixed position in the bottom of the tank. The movable ventilating device can also be installed in a rectangular, elongated ventilating tank, the reciprocatory movement being produced by the ventilation and hingeable damming walls and/or by motive force.

I claim:
1. Apparatus for purifying waste water comprising a circular tank to receive the waste water and having a bottom portion, a rotatably speed regulated bridge frame centrally mounted in the circular tank to swing thereover, at least one aerator secured in the bottom portion of the tank, and at least one aerator suspended from the bridge frame into the waste water and rotating with the bridge frame in the tank near the bottom portion thereof and over the bottom secured aerator to treat the waste water.

2. Apparatus according to claim 1, in which at least one damming device is suspended from the end of the bridge frame into the water at least into a part of its depth.

3. Apparatus according to claim 1, in which an air diffusion device is suspended from the end of the bridge frame into the entire depth of the water in the tank.

4. Apparatus according to claim 1, in which a shield member with an aerating and flushing device is provided secured on the bridge frame and suspended into the waste water to create horizontal water flow in the tank.

References Cited

UNITED STATES PATENTS

| | | | |
|---|---|---|---|
| 1,286,017 | 11/1918 | Jones | 210—15 X |
| 2,271,446 | 1/1942 | Unger | 210—63 |
| 3,330,413 | 7/1967 | Danjes | 210—221 X |

MICHAEL E. ROGERS, Primary Examiner

U.S. Cl. X.R.

210—14, 256; 261—124